Patented Aug. 7, 1934

1,969,213

UNITED STATES PATENT OFFICE 1,969,213

COPPER SALT COMPOSITIONS, PARTICULARLY AS A PRESERVATIVE LIQUID FOR TREATING TIMBER FABRIC AND OTHER MATERIALS

John Vargas Eyre and Herbert Langwell, Epsom, England, assignors to The Distillers Company Limited, Edinburgh, Great Britain No Drawing. Application November 28, 1931, Serial No. 577,862. In Great Britain November 29, 1930

13 Claims. (Cl. 134—78.6)

This invention relates to copper salt compositions, particularly as a preservative liquid for treating timber fabric and other materials subject to deterioration by fungi, dry rot, attack by termites, and so forth.

It is well known that most lower organisms are extremely sensitive to the toxic action of copper salts. For example copper oleate dissolved in a hydrocarbon solvent is used for preserving fishing nets. In the case, however, of requiring to use copper containing liquids in large amounts and for special purposes such as for treating timber, considerations of cost, odour, inflammability and the like become important and the chief object of the present invention is to provide a copper-containing composition capable of being used in large quantities at low cost, and possessed of good penetrability and other qualities necessary for the purpose in view.

According to the present invention solutions of copper salts of the higher fatty acids, particularly copper oleate, are used as the disperse phase in a water emulsion. The copper salt in its solvent can be emulsified in water by means of a suitable emulsifying agent and be stored as such ready for use, or addition of the water or of the water and emulsifier may be deferred until just prior to use. By suitably choosing the emulsifying agent and the solvent, emulsions can be made of high penetrability, freedom from objectionable odour and risk of fire, and of far less cost than mere solutions. Copper salts of saturated and/or unsaturated fatty acids substantially insoluble in water such as for example those of the acids resulting from soap and glycerine manufacture may be dissolved with any appropriate solvent.

The amount of water in which emulsification is effected may vary considerably; we may for example use only part of a total amount of water for emulsification before storage and add the remainder just before use.

Solvents quite appreciably soluble in water, such for example as butyl alcohol or diacetone alcohol, may be used by employing salting out agents in conjunction with them to reduce their water solubility.

The following are three examples of copper salt preservative compositions prepared in accordance with the present invention.

Example 1

15 gms. of copper oleate (containing about 10% cu.) is gently warmed with 750 cc. dry butyl lactate until dissolved. On cooling 825 gms. of neutral 50% Turkey red oil (sulphonated castor oil) is added and well incorporated. This mixture can then be emulsified as and when required in an amount of water not exceeding 3 litres. As the Turkey red oil of commerce may not be neutral, its condition may require adjusting with dilute acid or alkali.

Example 2

15 gms. of copper oleate is dissolved in 250 cc. of dry butyl alcohol. This solution is then mixed with 300 gms. Turkey red oil. This mixture can then be emulsified in 5 litres of water containing 200 grams of sodium chloride in solution.

Example 3

The sodium chloride in Example 2 is replaced by 750 gms. of $Na_2SO_4.10H_2O$.

Another example of a salting out agent is sodium acetate.

It is to be noted that the solvents used in this invention are neutral, polar compounds rather than the non-neutral or non-polar compounds previously employed.

What we claim is:—

1. A copper-containing water emulsion comprising a solution in butyl lactate of a substantially water-insoluble copper salt of a higher fatty acid, and an emulsifying agent, maintaining the solution dispersed in the water.

2. A copper-containing water emulsion comprising a solution in butyl alcohol of a substantially water-insoluble copper salt of a higher fatty acid, and an emulsifying agent, maintaining the solution dispersed in the water.

3. A copper-containing water emulsion comprising a solution in diacetone alcohol of a substantially water-insoluble copper salt of a higher fatty acid, and an emulsifying agent, maintaining the solution dispersed in the water.

4. A copper-containing water emulsion consistig of a solution of copper oleate in butyl lactate and an emulsifying agent, maintaining the solution dispersed in the water.

5. A copper-containing water emulsion consisting of a solution of copper oleate in butyl alcohol, and an emulsifying agent, maintaining the solution dispersed in the water.

6. A copper-containing water emulsion consisting of a solution of copper oleate in butyl lactate, and Turkey red oil as emulsifying agent.

7. A copper-containing water emulsion consisting of a solution of copper oleate in butyl alcohol, and Turkey red oil as emulsifying agent.

8. A copper-containing water emulsion consisting of a solution of copper oleate in diacetone alcohol, and Turkey red oil as emusifying agent.

9. For use in making a copper-containing water emusion by dispersal in water, a composition consisting of copper oleate, butyl lactate and Turkey red oil.

10. For use in making a copper-containing water emulsion by dispersal in water, a composition consisting of copper oleate, butyl alcohol and Turkey red oil.

11. For use in making a copper-containing water emulsion by dispersal in water, a composition consisting of copper oleate, diacetone alcohol and Turkey red oil.

12. A copper-containing water emulsion comprising a solution of a substantially water insoluble copper salt of a higher fatty acid in a solvent chosen from the group consisting of butyl lactate, butyl alcohol and diacetone alcohol, and an emulsifying agent, said solution being dispersed in the water.

13. A copper-containing water emulsion comprising a solution of copper oleate in a solvent chosen from the group consisting of butyl lactate, butyl alcohol and diacetone alcohol, and an emulsifying agent, said solution being dispersed in the water.

JOHN VARGAS EYRE.
HERBERT LANGWELL.